(12) United States Patent
Nwaeke

(10) Patent No.: US 8,276,692 B1
(45) Date of Patent: Oct. 2, 2012

(54) ELECTRONIC HAND TRUCK

(76) Inventor: Prince Frederick Nwaeke, Chicago, IL (US)

( * ) Notice: Subject to any disclaimer, the term of this patent is extended or adjusted under 35 U.S.C. 154(b) by 382 days.

(21) Appl. No.: 12/182,444

(22) Filed: Jul. 30, 2008

Related U.S. Application Data

(60) Provisional application No. 60/953,133, filed on Jul. 31, 2007.

(51) Int. Cl.
*B60K 1/00* (2006.01)
*B62D 51/04* (2006.01)

(52) U.S. Cl. ............... 180/65.1; 180/19.1; 280/79.6; 280/47.18

(58) Field of Classification Search .......... 280/79.6, 280/47.18, 47.131, 47.27, 47.26, 79.3, 280, 280/79.5; 180/19.3, 19.1, 19.2, 8.3, 168, 180/24.01, 13, 15, 65.1; 206/596, 504, 446; 414/421, 343, 534, 535, 592
See application file for complete search history.

(56) References Cited

U.S. PATENT DOCUMENTS

| | | | | |
|---|---|---|---|---|
| 2,763,383 A * | 9/1956 | McCoy | ............ | 280/79.6 |
| 3,019,916 A * | 2/1962 | Malcher | ............ | 206/596 |
| 3,380,546 A * | 4/1968 | Rabjohn | ............ | 180/15 |
| 3,436,093 A * | 4/1969 | Ruffley, Jr. | ............ | 280/47.27 |
| 5,525,884 A * | 6/1996 | Sugiura et al. | ............ | 180/168 |
| 5,547,035 A * | 8/1996 | Berry | ............ | 180/19.2 |
| 5,669,659 A * | 9/1997 | Dittmer | ............ | 280/47.18 |
| 5,846,043 A * | 12/1998 | Spath | ............ | 414/343 |
| 5,913,527 A * | 6/1999 | Hailston | ............ | 280/47.28 |
| 6,123,162 A * | 9/2000 | Rodriguez et al. | ............ | 180/8.3 |
| 6,247,710 B1 * | 6/2001 | Luberda | ............ | 280/47.28 |
| 6,276,471 B1 * | 8/2001 | Kratzenberg et al. | ............ | 180/19.3 |
| 6,302,414 B1 * | 10/2001 | Berthiaume et al. | ............ | 280/47.18 |
| 6,799,769 B2 * | 10/2004 | Ziolkowski | ............ | 280/47.27 |
| 6,880,672 B2 * | 4/2005 | Imberi | ............ | 182/13 |
| 6,887,029 B1 * | 5/2005 | Robinson | ............ | 414/592 |
| 6,894,232 B2 * | 5/2005 | Waggoner et al. | ............ | 177/25.15 |
| 7,090,042 B2 * | 8/2006 | Coveyou et al. | ............ | 180/24.01 |
| 7,195,257 B2 * | 3/2007 | Stoneback et al. | ............ | 280/79.6 |
| 7,367,571 B1 * | 5/2008 | Nichols | ............ | 280/47.18 |
| 7,779,941 B1 * | 8/2010 | Rankin et al. | ............ | 180/19.1 |

* cited by examiner

*Primary Examiner* — Hau Phan
(74) *Attorney, Agent, or Firm* — Denison & Assocs., PC; JoAnne Denison; Marianne Buckley

(57) ABSTRACT

The present invention consists of an electric powered, motorized hand truck having a substantially rectangular platform, at least four wheels, an electronic control panel, and a plurality of frames adapted to retain at least one cylindrical container. The frames are removably secured either horizontally or vertically to the rectangular platform. A gear axle and motor apparatus is secured to power the movement of the truck. Furthermore, a lithium ion rechargeable battery pack may be provided as an energy source for the motor, although different types of motors may be used including, but not limited to: gasoline, fuel cell, bio-diesel and diesel.

17 Claims, 4 Drawing Sheets

ELECTRONIC HAND TRUCK

FIELD OF THE INVENTION

The present invention relates to the field of motorized automated hand trucks and carts and more specifically those which are utilized in transferring large quantities of supplies and materials, such as multiple five-gallon water containers, from one destination to another.

BACKGROUND OF THE INVENTION

Currently, in the marketplace, there are available a wide variety of carts and trucks utilized to carry heavy materials and supplies from one point to another. These carts and trucks are mainly utilized in order to ease the physical stress placed upon a person when transporting heavy and large materials, usually by placing such materials upon some sort of loading area supported by a plurality of wheels.

In reviewing the prior art, various hand carts and trucks are disclosed which are utilized to reduce the physical strain in transporting materials. For example, the Barley, U.S. Pat. No. 454,448 discloses a barrel rack and truck which have rollers which provide mobility and they also have a rounded end that allows it to tilt and easily mount a barrel to the rack and truck. Similarly, the Maxim, U.S. Pat. No. 753,284 discloses an electrically-propelled vehicle that is suited to carry baggage or other such loads, and is battery powered. This vehicle has a horizontal base or platform mounted and supported upon an axle and driving wheels.

In another prior art patent, Russel U.S. Pat. No. 1,103,689 discloses a truck for milk cans where one truck may be attached to top of another truck, thus allowing two layers of milk cans to be transported in a single journey. This truck has a rectangular platform atop four wheels with sections of pipe forming the sides bars and the ends of a frame surrounding the outside of the platform. The milk cans are placed within this frame during transport.

The Black U.S. Pat. No. 2,027,265 discloses a truck adapted to hold a single barrel or other round objects with castor wheels and a handle. The frame is of rectangular configuration and also has side bars and end bars shaped to conform to the contours of a barrel.

The McCoy U.S. Pat. No. 2,763,383 discloses a vehicle for loading and unloading cylindrical containers containing a mechanized hoist for the containers. The truck is comprised of a base with a cradle adapted to retain cylindrical objects for transport. The Knoll U.S. Pat. No. 5,791,667 discloses a wheelbarrow having compartments for removably securing individual circular buckets that may be loaded with different bulk materials.

The prior art also shows various hand trucks and carts are combined with a scale in order to determine weight of the material as well as to ease its transport. For example, the Sawyer U.S. Pat. No. 656,729 discloses a cart with a scale incorporated therein. This scale is functional when the truck is in a horizontal position as well as positions varying from horizontal by as much as 45° and the hand truck consists of a truck frame having side rails and cross bars furnished with a pair wheels. Similarly, the Bricker U.S. Pat. No. 884,459 discloses a hand truck that has a scale and a removable bag holder incorporated into it. This hand truck comprises a tubular column for a frame, a pair of wheels, and a scale platform secured to the frame. While the Walding U.S. Pat. No. 2,659,591, discloses a push cart with a weight indicator and a basket that is particularly suited to weigh clothes, the Handford U.S. Pat. No. 6,222,137 B1 discloses a portable scale having a triangular scale deck, three load cells, an electronic controller, and dolly-type wheels.

The prior art also reveals various carts and trucks that facilitate transport by utilizing a motor to turn the wheels of a cart or truck. In Schreck, U.S. Pat. No. 2,209,356, a hand operated motorized truck suited to lift loaded skids into warehouses and factories is disclosed; it also discloses a motorized truck with compact steering and propelling unit that may be easily stopped and started.

The Boza U.S. Des. Pat. No. 153,255 discloses a cart having one wheel adjacent its handles, two wheels near its mid-section, and a motorized axle driving the two middle wheels, as well as a platform with vertical members.

The Montana U.S. Pat. No. 2,740,484 discloses a motor driven stair climbing hand cart which includes parallel transverse shafts on the truck frame. The cart is intended to transport a load placed upon its foot plate while is rolled up ramps or stairs by a set of motorized traction wheels.

The Jones, U.S. Pat. No. 3,312,300 discloses a power operated utility cart having three wheels which may be configured to hold baskets, golf clubs, or warehouse items. Similarly, the Bruske U.S. Pat. No. 3,572,455 discloses a self propelled three wheel maintenance cart which is battery propelled and has a high tailgate that can also be used as a ramp, while the U.S. Lovell Pat. No. 4,081,047 discloses a small three-wheeled motorized cart which may be used to carry golf clubs, groceries, or children, where a break is automatically activated when the cart is stopped, and a separate break keeps it from going downhill.

The Seider U.S. Pat. No. 4,167,983 discloses an electrically powered food service vehicle with electrically powered warming areas and electrical propulsion that is utilized to transport food serving trays while maintaining the food at a desired temperature.

The Rabjohn U.S. Pat. No. 3,380,546 discloses a traction drive with a self-contained power pack for small vehicles which can be connected to one or all of the wheels on a cart to add electrical power to a cart.

The Carter U.S. Pat. No. 4,538,696 discloses a three wheeled collapsible battery operated cart for golf clubs having a removable club storage rack which is adapted to hold different types of golf clubs.

The Hooley U.S. Pat. No. 4,465,290 discloses a shopping cart with a signaling system which detects the presence or absence of a load placed on the lower tray of the cart, which is particularly useful in alerting clerks to the presence of forgotten merchandise on the lower tray.

The Moist U.S. Pat. No. 4,809,790 discloses a powered cart, preferably gasoline powered, adapted to fit between rows of crops to carry materials to replace heavy parts of irrigation rigs.

The Meshulam U.S. Pat. No. 4,429,758 discloses a motorized cart capable for carrying palates or boxes over rough terrain and steep hills, such as the type of terrain avocados or citrus are grown.

The Scott U.S. Pat. No. 5,577,568 discloses a self-propelled hand truck having a driven wheel, a nondriven wheel, a drive train, motor and transmission secured to the frame. This hand truck can operate in a self-propelled mode or in a conventional operator-propelled mode.

The Campbell et al. U.S. Pat. No. 6,062,328 discloses an electric powered handcart having a frame, a pair of frame brackets, a load plate, a handle, a set of wheels with a third wheel positioned above and behind the set, and an electric motor and battery mounted attached to the frame.

The Sueshige et al. U.S. Pat. No. 6,129,166 discloses a four-wheeled electromotive cart and a direct axle driving mechanism for driving the axle of left and right front wheels with a motor.

The Kratzenberg et al. U.S. Pat. No. 6,276,471 B1 discloses a delivery cart having a control unit which controls power supplied to the motors. The control unit provides an electronic computer and free programmable memory used for actuating the motors attached to the support wheels.

The Eberlein et al. U.S. Pat. No. 6,343,665 B1 discloses a hand-movable cart having a motor, a drive chassis with four casters and a power source located within a space not required by the pushcart during use.

The Hopper et al. U.S. Pat. No. 6,752,224 B2 discloses a wheeled carriage for supporting a patient in a substantially horizontal position. The wheeled carriage provides a patient support mounted on a wheeled base, an auxiliary wheel support system and a control apparatus for controlling the auxiliary wheel support system.

The Van Seumeren U.S. Pat. No. 6,855,894 B1 discloses a mobile lifting device having a mobile frame with a set of lift forks. The mobile lifting device will also have a weighing device that provides a display panel and a pressure or strain-sensitive sensor.

The Holtan et al. U.S. Pat. No. 6,880,652 B2 discloses a shopping cart transporter for use in parking lots. The device utilizes a cable that is retractably mounted on the base and stretches to surround the line of shopping carts to be pulled by a hand operated motor-driven base.

The Kime et al. U.S. Publication No. 2004/134,692 A1 discloses a freestanding self-propelled device for moving objects. The self-propelled device has a chassis with lower frame portions and upright frame portions. A single drive wheel is located between sets of support wheels coupled to the lower frame portion of the chassis.

The Coale U.S. Publication No. 2004/216,933 A1 discloses an electric vehicle having four wheels attached to a framework and body structure containing a vehicle motion control devices, a system for camping gear storage containers, and an electric motor and photovoltaic panels for recharging the batteries. The device is especially adapted for transporting camping gear over rough terrain.

The David et al. U.S. Publication No. 2005/39,957 A1 discloses a pedestrian truck with a drive motor and a handle lever that includes a head and a rod.

The Chambers U.S. Pat. No. 7,163,213 B2 discloses a hand truck powered by an electric motor having a power source, a programmable motor controller and a transaxle.

The Waid U.S. Pat. No. 7,210,545 B1 discloses a three-wheel motorized cart for transporting beach related items over sandy terrain. The cart has a cargo frame, a platform, a steering and control handle attached to the rear of the cargo frame, and an electric motor with a control assembly.

The Hemsley U.S. Publication No. 2007/131,462 A1 discloses a control apparatus for an article such as suitcase with motorized wheels. The control apparatus has transducers to sense force applied to the handle pushing or pulling the suitcase and control units connected to each transducer for controlling the speed and rotation of each motorized wheel.

The prior art further reveals various carts and trucks that are used to facilitate the transport of five-gallon water bottles. The Hettman U.S. Pat. No. 4,418,969 discloses a bottle chemical handling system with a cart having shelves arranged at compound angles which allows chemicals to be stored in positions which eliminate rolling and/or keeps the chemicals away from the neck of the bottles.

The Sheets U.S. Pat. No. 5,104,135 discloses a bottled water carrier that is configured to easily allow an operator to wheel as many as five bottles of water at one time. Similarly, the Hailston U.S. Pat. No. 5,913,527 discloses a two-wheeled hand truck having a frame made from a pair of horizontally spaced, vertically extending side rails, connected by crosswise braces laterally. This hand truck has withdrawable support platforms or trays for supporting one or more large, 5-gallon bottled type water containers on its sides.

The Spath Pat. No. 5,846,043 discloses a cart and caddie system for storing and transporting standard, multi-gallon water bottles. The cart has a lower deck for depleted water bottles and an upper roller deck for filled water bottles having an outlet end. The caddie, which is removably attached to the cart, provides a swivelled cradle where a filled water bottle is transferred from the upper roller deck of the cart, to a positioned adjacent a water dispenser.

The Luberda Pat. No. 6,247,710 B1 discloses a detachable bottle carrier for a two-wheel hand truck. The bottle carrier provides a frame having a projecting platform and a bottle girth enveloping element.

The Berthiaume et al. Pat. No. 6,302,414 B1 discloses a hand truck fitted with a tray configured to support bottled water containers on the main frame of the truck with a pair of upright end supports.

The Chriswell et al. U.S. Pat. No. 7,168,599 B1 discloses a water-handling system where a hand truck is configured to carry a water bottle on a platform which is transported to a dispensing cabinet which the hand truck engages and locks into the cabinet.

The Stoneback et al. U.S. Pat. No. 7,195,257 B2 discloses a cargo hand truck system with a cradle assembly having a pair of support rails with upper and lower portions and a cross bar spanning the support rails for carrying cylindrical containers.

Thus, nowhere in the prior is seen a motorized hand truck comprising of a multi functional electronic control panel, a motor/engine with auto brake and gear system, a horn, dual joined handle, and removable frames adapted to retain as many as 16 to 24, five-gallon cylindrical water containers.

SUMMARY OF THE INVENTION

The present invention consists of a battery powered, motorized hand truck having a substantially rectangular platform, at least four wheels, an electronic control panel, and a plurality of frames adapted to retain at least one cylindrical container. The frames are removably securable either horizontally or vertically to the rectangular platform, and designed to carry eight bottles each for a total of 16 bottles per handtruck. A gear axle and motor apparatus is provided to power the movement of the truck. A means for steering the hand truck is also provided along with a dual joined handle that will house the electronic control panel and allow for the adjustment and movement of the hand truck. Furthermore, a battery pack will be present to provide power to the motor.

In one preferred embodiment of the present invention, the means to steer the hand truck will be provided near the front of the hand truck where it will be connected to the motor and gear axle powering the front pair of wheels. This truck handle may have a built in warmer during the cold season. The four wheels will consist of two pairs of different sized wheels. The front pair of wheels, that is also connected to the motor and gear axle, will preferably be of a more rugged, durable material and tread, and sufficiently large enough for hand truck to accommodate varying terrain. Preferably, the present invention will provide two frames with each frame each adapted to receive and support eight cylindrical containers. Each frame is made from a light, durable, material that is able to support the weight of at least four to six 75 pound water bottles. Such material may consist of, but is not limited to: steel, steel alloys, stainless steels, aluminum, copolymers, carbon fiber, and metal matrix composites. The frames may also provide a nylon strap that would run from the front of the platform, over the frames, retain the cylindrical containers, and removably secure to a hook at the rear of the platform.

The frames preferably removably secure themselves to the platform of the hand truck by a means for attachment. Such means for attachment may be an insert on the platform adapted to receive the base of the frames and locking them into place. The insert on the platform is preferably adapted to receive the frames either horizontally or vertically.

The present invention would be powered by either a battery or a fuel-powered motor. The fuel-powered motor could utilize gasoline, diesel, biodiesel, or fuel-cell. The battery powered motor could include lead/acid batteries, lithium cadmium ion batteries, or other battery technology. The motor would enable a maximum speed of 6 km/hr, with an adjustable speed of 4-5 km/hr.

The present invention would also provide an auto brake system, an auto gear system, a free wheel mode, and a security system. It would provide an incline rating of six degrees, and a slope angle of about 20 degrees. Preferably, the security system may be a key to the electronic control panel, or a padlock that may be placed upon the wheels of the invention.

The present invention, preferably will be capable of retaining, transporting, loading and unloading up to 16 to 24 five gallon water bottles.

OBJECTS OF THE INVENTION

Thus, it is one primary object of the present invention to provide a motorized, battery powered hand truck able to retain water bottles by having frames removably securable to a truck platform.

It is yet another primary object of the present invention to provide a motorized, battery powered hand truck with a system for retaining water bottles which has a security system.

It is yet another primary object of the present invention to provide a motorized, battery powered hand truck capable of retaining up to 16 to 24 five gallon water bottles with a system of removably securable frames adapted for receiving at least one cylindrical container.

It is yet another primary object of the present invention to provide a hand truck which is capable of moving loads of up to 1,200 to 1,800 pounds (454-816 Kg) over pavement affected with a variety of weather conditions such as snow, rain, and ice by providing battery powered motor, gear axle, and a large pair of wheels.

It is yet another object of the present invention to provide a motorized, battery powered hand truck having the removably securable frames lightweight, as to reduce the total amount of power required to propel the hand truck.

It is yet another primary object of the present invention to provide motorized, battery powered hand truck having an electronic control panel to display information regarding speed, load weight, time and battery power to control the motion of the vehicle.

It is yet another primary object of the present invention to provide a motorized, battery powered hand truck having a scale integral to the platform to determine the weight of products placed on the device.

It is yet another object of the invention to provide a motorized, battery powered hand truck having four wheels with rugged, durable, treaded, sufficiently large tires that the hand truck may accommodate varying terrain.

It is yet another object of the invention to provide an automatic braking mechanism which is activated whenever the user ceases pushing the hand truck.

It is yet another object of the invention to provide a motorized, battery powered hand truck with a frame system for retaining water bottles with a free wheel mode so that the motorized wheels may be released and the hand truck may be pushed if the battery is discharged.

It is yet another object of the invention to provide a motorized, battery powered hand truck with a frame for retaining water bottles which additionally may be provided with one or more of the follow items for the comfort of the user: a cupholder, a chair, a horn, and a nylon strap.

It is yet another object of the invention to provide a motorized hand truck having a frame for retaining water bottles which has a 24V, 12 amp rechargeable Lithium cadmium ion battery.

It is yet another object of the invention to provide a motorized hand truck having a handle which is able to be warmed.

It is yet another object of the invention to provide a motorized hand truck having a frame for retaining water bottles which has a rechargable lead/acid battery.

It is yet another object of the invention to provide a motorized hand truck having a frame for retaining water bottles in which the motor is selected from one of the following types: gasoline, diesel, bio-diesel, or fuel cell.

It is yet another object of the invention to provide a motorized, battery powered hand truck having a frame for retaining water bottles in which a nylon strap and hook is additionally provided to further secure the water bottles within the frames.

It is yet another object of the invention to provide a motorized hand truck with a framework for retaining water bottles having four wheels, and optionally, two matched pairs of wheels in which one pair of wheels is larger than the other pair of wheels to allow navigation of uneven surfaces.

It is yet another object of the invention to provide a motorized hand truck having an incline rating of 6 degrees and a slope angle of 20 degrees.

It is yet another object of the invention to provide a motorized hand truck having a maximum speed of 6 km/hr (3.76 mph), with an adjustable speed of 4-5 km/hr.

It is yet another object of the invention to provide a motorized hand truck with a clip holder adapted to receive an invoice of other piece of paper.

These and other objects and advantages of the present invention can be readily derived from the following drawings present herein and should be considered as within the overall scope of the invention.

DETAILED DESCRIPTION OF THE DRAWINGS

Figure 1:
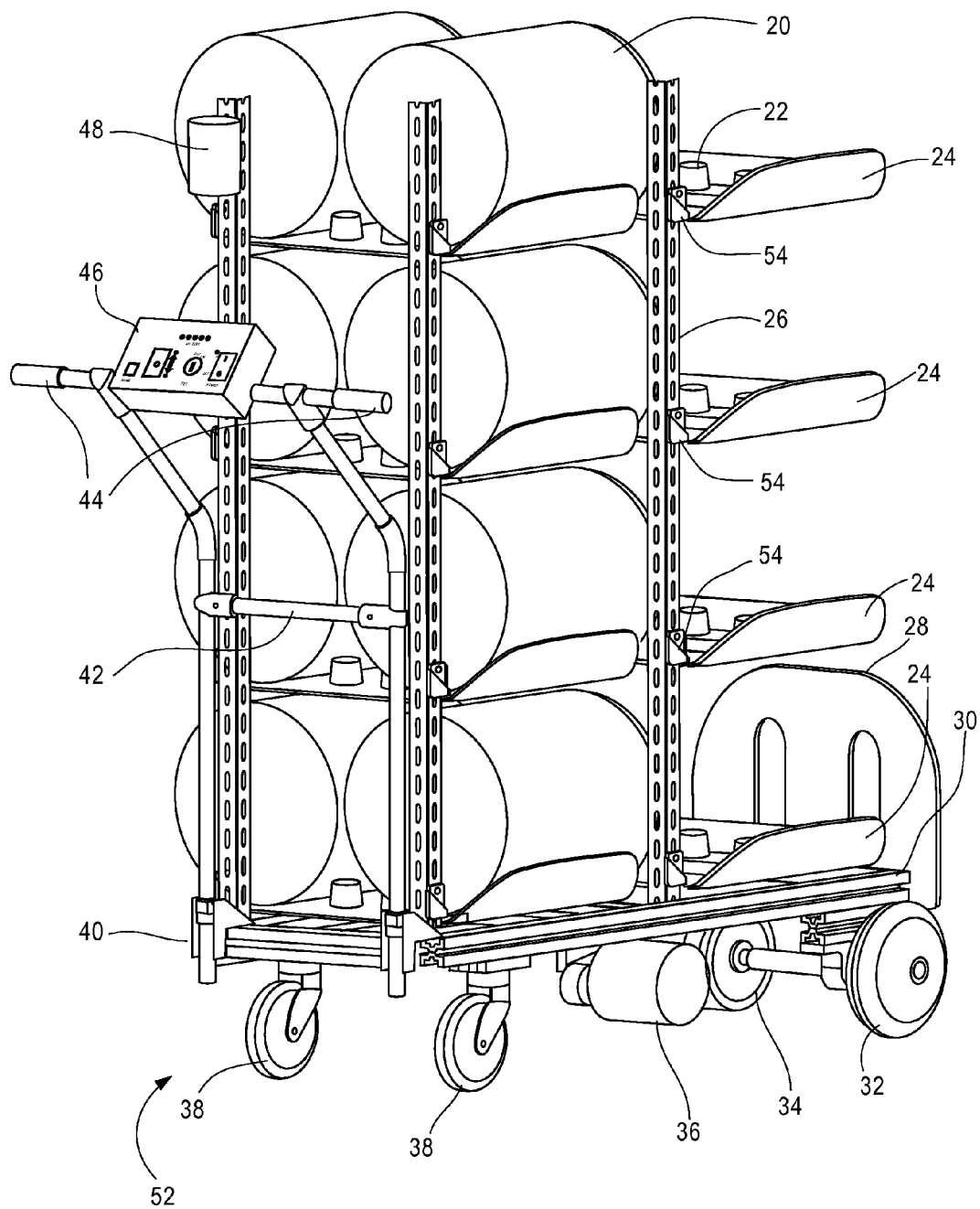
FIG. 1 is a view of the improved electronic hand truck.

FIG. 1 is a view of improved electronic hand truck 52. It is designed to carry water bottles 20. These bottles are stabilized by rubber protuberances 22, which are attached to trays 24. One end of the hand truck has U frame 28. Frame lock 30 holds removable frame 50 to the hand truck.

The hand truck moves around on wheels 32 and 38. Wheels 32 are powered by motor 36, which communicates with the wheels via a chain which is enclosed in chain box 34. Wheels 38 provide steering capability for the hand truck. Hinge 40 connects the handle to the base of the hand truck, which is designed to fold down after the detachable frames 26 are removed. Foldable hand 42 steadies the handles 44, which allow for steering right and left. Control panel 46 is also attached to the handles. Finally, the electronic hand truck may be provided with cupholder 48. Hinge 54 allows tray 24 to fold up for storage of detachable frame 26.

Figure 2:
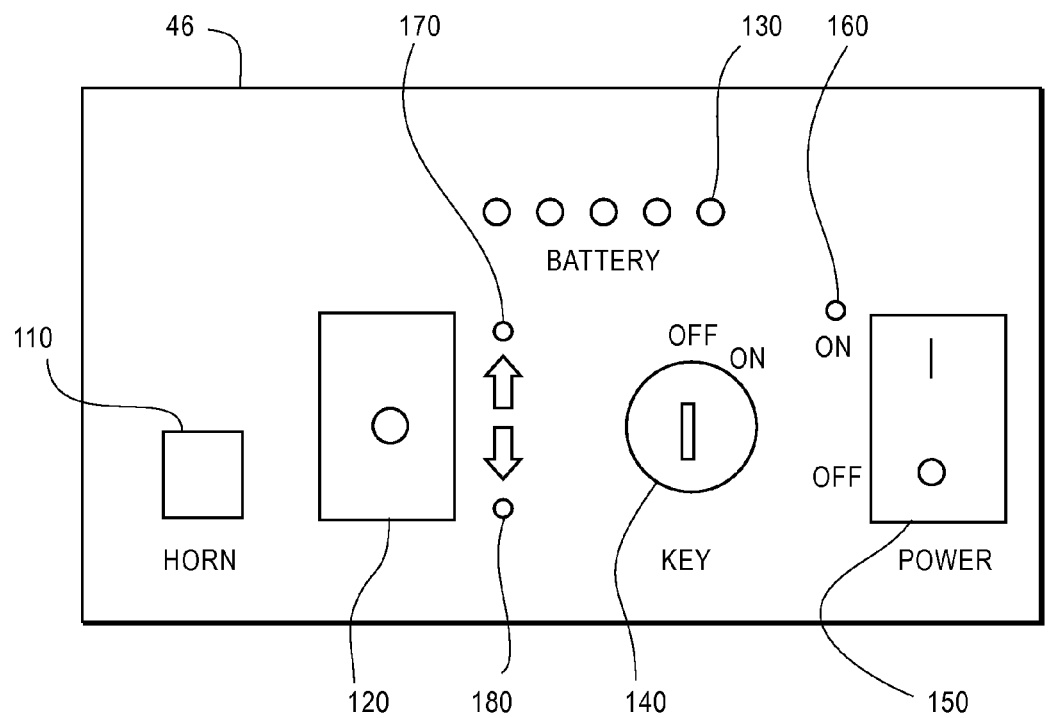
FIG. 2 is a detail of the control panel.

FIG. 2 Is a detail of control panel 46. It shows some of the possibilities for features to be included on the control panel display, including battery indicator 130, horn 110, power switch 150, power indicator light 160, key/security system 140, and forward and reverse control 120, forward indicator light 170 and reverse indicator light 180. These are just some of the possible controls that could be included on the panels.

Figure 3:
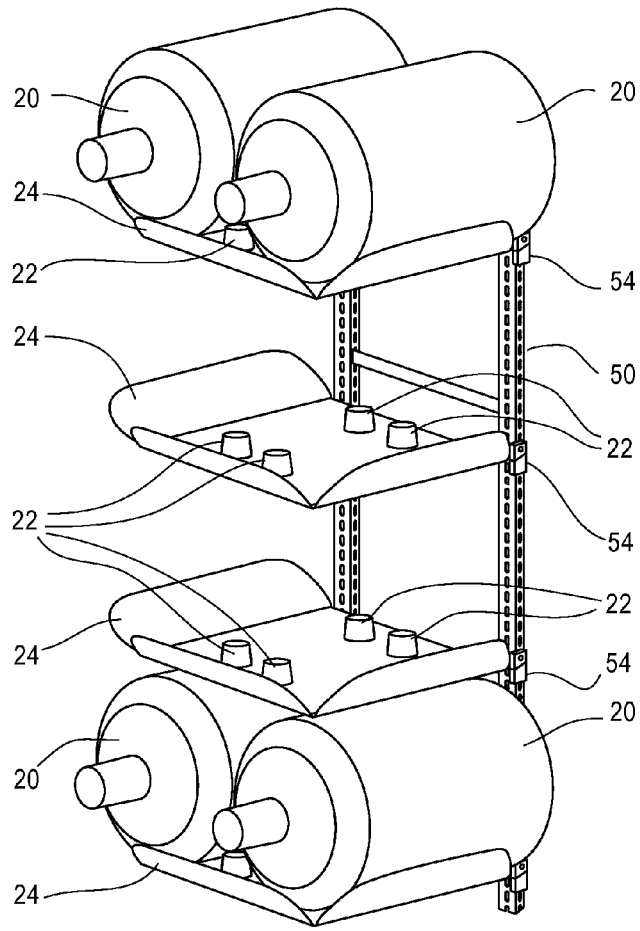
FIG. 3 is a detail of a detachable frame.

FIG. 3 is a detail of detachable frame 50. It shows a tray with four frames 24, holding four water bottles 20. Every tray shown has rubber protuberances 22. This frame 26 is designed to be removed from the cart 52 so that hand truck 52 can fold for easy storage. Hinges 54 allow the trays 24 to fold for easier storage of detachable frame 50.

Figure 4:
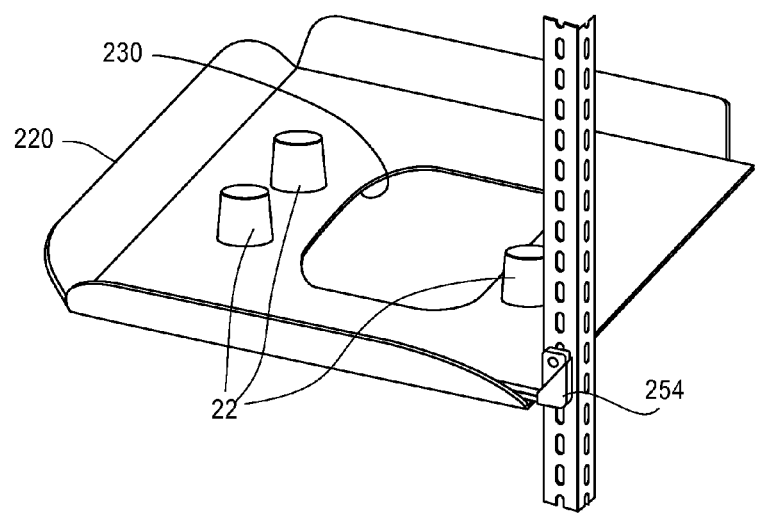
FIG. 4 is a detail of a tray.

FIG. 4 is a detail of an alternate embodiment of tray 220. It shows rubber protuberances 22, hinge 254, and aperture 230, which reduces the weight of the tray.

Figure 5:
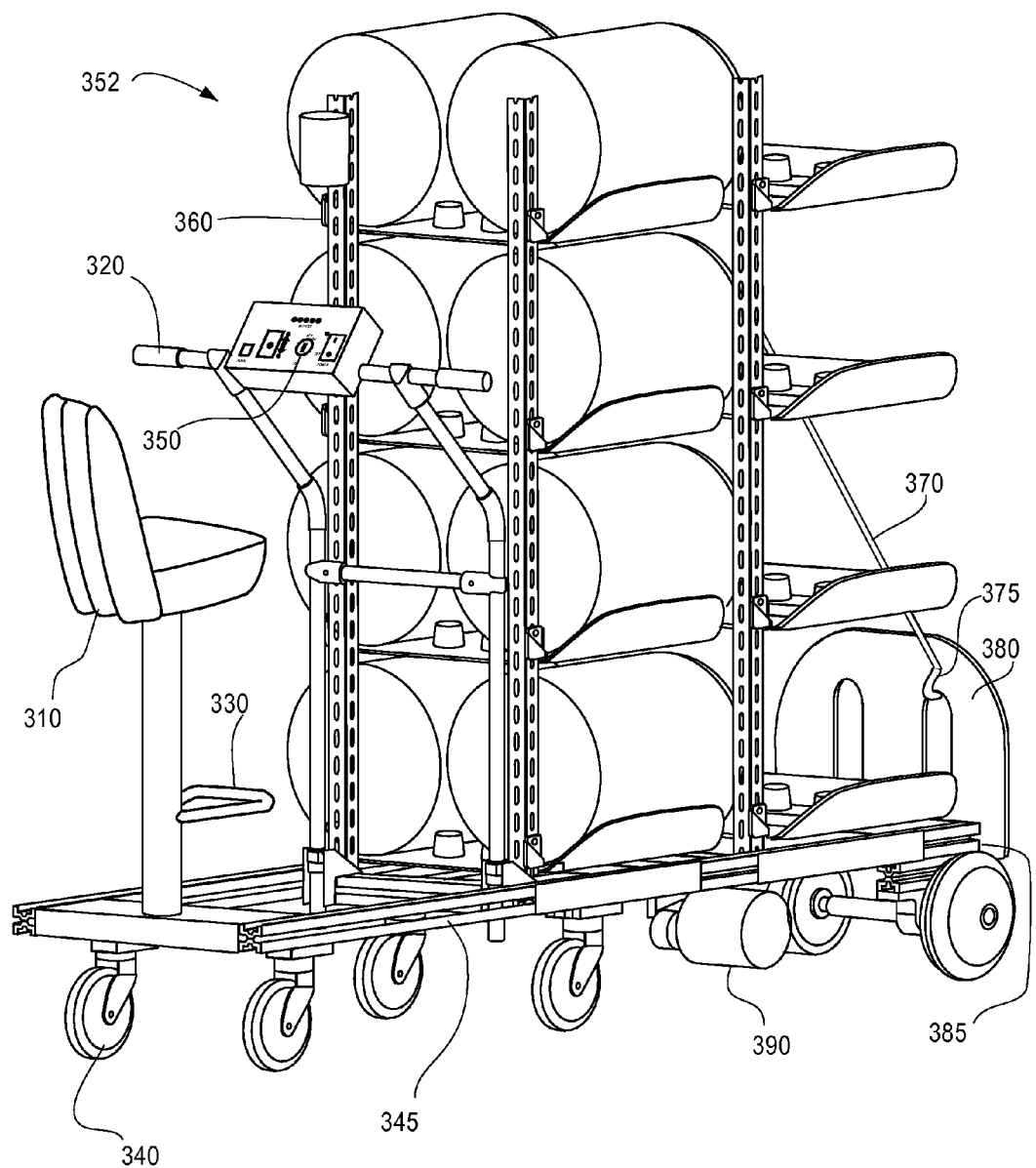
FIG. 5 is another view of improved electronic hand truck.

FIG. 5 shows some additional features hand truck 352 may be provided with. Warmed handles 320 provide user with additional comfort during inclement weather. Chair 310 with footrest 330 is shown supported by wheel frame 345 and wheels 340. Invoice clip 360 is also shown, and ignition switch 350 highlights its use as a security system. Nylon strap 370 and hook 375 is also shown, as well as a readout 380 for scale 385, which is built into the base of hand truck 352. Finally, built into the system for transferring energy from the engine to the wheels is an allowance for a free wheel mode 390.

What is claimed is:

1. An electronic hand truck for carrying at least one cylindrical container comprising:
    substantially rectangular wheel frame having a first portion and a second portion,
    at least four wheels secured to the second portion of the wheel frame,
    at least two frames, wherein the at least two frames are substantially vertical when in use,
    at least one tray, having substantially partially cylindrical edges and which is substantially horizontal when in use, removably mounted to the at least two frames, thereby forming a frame assembly adapted to receive at least one cylindrical container,
    a motor secured to the second portion of the wheel frame,
    an energy supply for the motor,
    a displaceable handle removably connected to the wheel frame,
    an electronic control panel attached to the handle, wherein the electronic control panel controls the forward and reverse motion of the hand truck,
    wherein the frame assembly is substantially vertical and removably securable to the first portion of the wheel frame.

2. The apparatus in claim 1 further having an invoice clip removably secured to the frame assembly.

3. The apparatus in claim 1 wherein the at least four wheels comprise two pairs of different sizes.

4. The apparatus in claim 1 wherein the frame assembly is composed of a lightweight material which is a member of the group consisting of steel, steel alloys, stainless steels, aluminum, copolymers, carbon fiber, and metal matrix composites.

5. The apparatus in claim 1 wherein the energy supply is a battery.

6. The apparatus in claim 5 wherein the battery operates at substantially 24 volts and 12 amps.

7. The apparatus in claim 5 wherein the battery type is a lithium cadmium ion.

8. The apparatus in claim 5 wherein the battery type is a lead/acid battery.

9. The apparatus in claim 1 wherein the energy supply is selected from one or more of the following: gasoline, fuel cell, bio-diesel and diesel.

10. The apparatus in claim 1 wherein the apparatus additionally contains a scale.

11. The apparatus in claim 1 wherein the wheels contain a free wheel mode.

12. The apparatus in claim 1 wherein the at least one tray is provided with rubber protuberances.

13. The apparatus in claim 1 wherein the at least one tray has an aperture.

14. The apparatus in claim 1 wherein the handle has a built in warmer.

15. The apparatus in claim 1 where the maximum speed is 6 km/hr.

16. The apparatus in claim 1 where the apparatus is capable of carrying 8 bottles.

17. The apparatus in claim 1 where the incline rating is 6 degrees and the slope angle is 20 degrees.

* * * * *

UNITED STATES PATENT AND TRADEMARK OFFICE
CERTIFICATE OF CORRECTION

| | | |
|---|---|---|
| PATENT NO. | : 8,276,692 B1 | Page 1 of 1 |
| APPLICATION NO. | : 12/182444 | |
| DATED | : October 2, 2012 | |
| INVENTOR(S) | : Prince Frederick Nwaeke | |

It is certified that error appears in the above-identified patent and that said Letters Patent is hereby corrected as shown below:

Column 7, line 42, before "substantially" insert -- a --

Signed and Sealed this

Thirteenth Day of November, 2012

David J. Kappos
*Director of the United States Patent and Trademark Office*